United States Patent
Caruba

(10) Patent No.: US 10,218,831 B1
(45) Date of Patent: Feb. 26, 2019

(54) COMBINATION SHOULDER CRADLE AND PROTECTIVE CASE FOR MOBILE PHONES

(71) Applicant: Roger A. Caruba, Long Branch, NJ (US)

(72) Inventor: Roger A. Caruba, Long Branch, NJ (US)

( * ) Notice: Subject to any disclaimer, the term of this patent is extended or adjusted under 35 U.S.C. 154(b) by 0 days.

(21) Appl. No.: 15/856,683

(22) Filed: Dec. 28, 2017

(51) Int. Cl.
*H04M 1/04* (2006.01)
*B60R 11/02* (2006.01)
*B60R 11/00* (2006.01)

(52) U.S. Cl.
CPC ........... *H04M 1/04* (2013.01); *B60R 11/0241* (2013.01); *B60R 2011/008* (2013.01)

(58) Field of Classification Search
CPC . H04M 1/04; B60R 11/0241; B60R 2011/008
See application file for complete search history.

(56) References Cited

U.S. PATENT DOCUMENTS

| 4,320,262 A | 3/1982 | Read |
| 6,535,606 B2 | 3/2003 | Cox |
| 8,878,637 B2 * | 11/2014 | Sartee ........................ G06F 1/16 335/219 |
| 2003/0185389 A1 | 10/2003 | Wheatley |
| 2008/0062625 A1 * | 3/2008 | Batio ..................... G06F 1/1615 361/679.29 |
| 2016/0366997 A1 * | 12/2016 | Sirichai .................. A45C 11/00 |
| 2017/0251790 A1 * | 9/2017 | Bedasee ................. A45C 11/00 |

* cited by examiner

*Primary Examiner* — Tuan D Nguyen
(74) *Attorney, Agent, or Firm* — Thomas J. Germinario

(57) ABSTRACT

A composite protective case for a mobile phone comprises a back panel, into which the phone snugly fits, and a trifold cover panel hingeably attached to the back panel. When folded backward over the rear wall of the back panel, the cover panel forms an arch with an elevated medial section that can support the phone on the shoulder of a user. Multiple attachment points for the cover panel on the rear wall of the back panel enable the arched elevation of the phone to be adjusted based on the user's physical size and proportions.

3 Claims, 4 Drawing Sheets

COMBINATION SHOULDER CRADLE AND PROTECTIVE CASE FOR MOBILE PHONES

FIELD OF INVENTION

The present invention relates to the general field of shoulder cradles for telephone receivers and more particularly to shoulder cradles for mobile phones.

BACKGROUND OF THE INVENTION

The need to have one's hands free for other tasks, such as writing, while conversing on the telephone has led to the design of various devices that facilitate cradling the telephone/receiver between the shoulder and ear. In the context of land line phones, such cradles have tended to be rather bulky, since portability is not a major feature of these phones. But as applied to wireless telephones, and particularly smartphones, a shoulder cradle must be compact so as not to compromise the portability of the phone. The object of the present invention is to provide a shoulder cradle that unfolds when not in use to form the cover of a protective case so as not to add to the bulk of the phone.

SUMMARY OF THE INVENTION

The present invention is a composite protective case for a mobile phone. The protective case comprises a back panel, which is a conventional open rectangular enclosure of rigid durable material, into which the phone snugly fits, and a trifold cover panel that conforms to the size and shape of the back panel and is hingeably attached to the back panel. In the closed configuration, the cover panel extends over the front opening of the back panel, so as to cover and protect the phone's screen.

When folded backward over the rear wall of the back panel, the cover panel's trifold structure can be arched by inserting a tab or hook-and-loop fastener on the distal edge of the cover panel into one of multiple conjugate slots or hook-and-loop fasteners on the rear wall of the back panel. The medial section of the cover panel is thereby elevated above the back panel so as to form a ridge that can engage the shoulder of a phone user and support the phone hands free in comfortable proximity to the user's ear. The cover panel is preferably made of a semi-rigid plastic material.

The tab or fastener on the cover panel can be alternately connected to any one of multiple conjugate slots or fasteners on the rear wall of the back panel in order to adjust the elevation of the phone above the user's shoulder to a height best suited to the physical size and proportions of the user. For example, a tall person, having a greater separation between his/her shoulder and ear, would select a maximum trifold elevation, while a small person would select a minimum trifold elevation.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
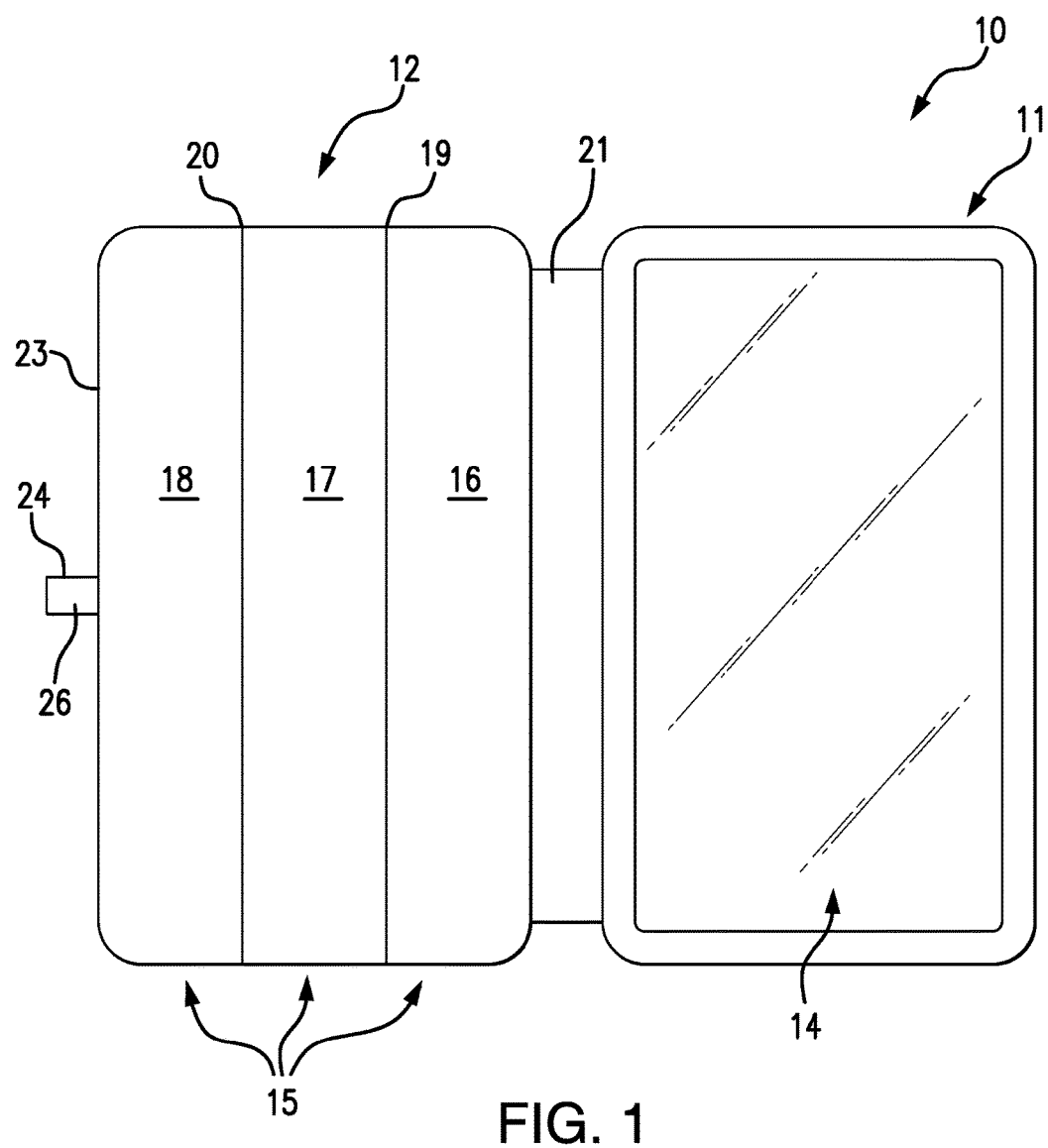
FIG. 1 is a plan view of the obverse side of the preferred embodiment of the present invention.
Figure 2:
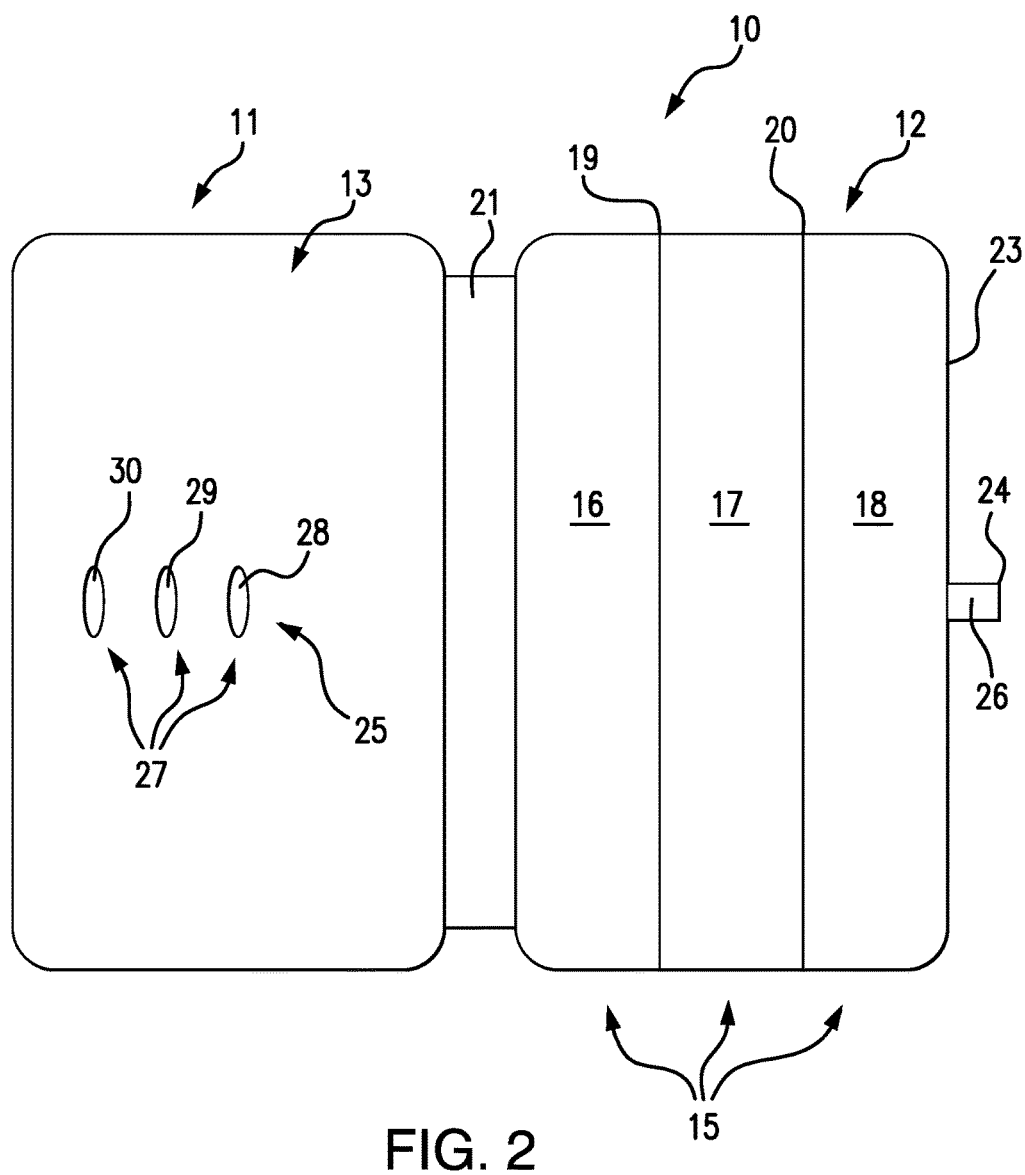
FIG. 2 is a plan view of the reverse side of the preferred embodiment of the present invention.

Referring to FIGS. 1 and 2, the composite mobile phone protective case and shoulder cradle according to the preferred embodiment of the present invention 10 comprises a back panel 11 and a trifold cover panel 12. The back panel 11 defines a substantially rectangular structure having a solid rear wall 13 and a front opening 14. A mobile phone (not shown) fits securely inside the back panel 11 with its screen and controls exposed through the front opening 14, as is conventional in the art. The back panel is made of a durable, rigid material, preferably plastic.

The cover panel 12 has a trifold structure comprising three longitudinal cover sections 15, which consist of a proximal cover section 16, a medial cover section 17 and a distal cover section 18. The proximal and medial cover sections 16 17 are connected by a flexible medial hinge strip 19, while the medial and distal cover sections 17 18 are connected by a flexible distal hinge strip 20. The medial and distal hinge strips 19 20 are thin, narrow strips of a flexible material, preferably plastic, which allows the cover sections 15 to rotate with respect to one another, such that the cover panel 12 can be bent into an arched configuration, as best seen in FIGS. 3A and 3B.

The trifold cover panel 12 conforms to the size and shape of the back panel 11 and is longitudinally attached, through the proximal cover section 16, to the back panel 11 by a flexible main hinge strip 21. The main hinge strip 21 is wider than the medial and distal hinge strips 19 20, but it preferably consists of the same flexible plastic material, which allows the cover panel 12 to be either folded forward over the front opening 14 of the back panel 11, in a closed configuration, or arched backward over the rear wall 13 of the back panel 11, in one of multiple cradle configurations 22, as best seen in FIGS. 3A and 3B.

The distal cover section 18 of the trifold cover panel 12 has a distal edge 23 containing a primary attachment means 24. The primary attachment means 24 conjugately connects with any one of multiple secondary attachment means 25 on the rear wall 13 of the back panel 11, so as to support the control panel in one of multiple cradle configurations 22, best seen in FIGS. 3A and 3B. The primary attachment means 24 can be a tab 26, as shown in FIG. 2, or a hook-and-loop fastener. The secondary attachment means 25 corresponding to the tab are multiple slots 27 in the rear wall 13 of the back panel 11. Where the primary attachment means 24 is a hook-and-loop fastener, the secondary attachment means 25 are conjugate hook-and-loop fasteners. In the exemplary rear wall 13 depicted in FIG. 2, there are three slots 27, corresponding to high 28, medium 29 and low 30 cradle configurations 22.

Figure 3A:
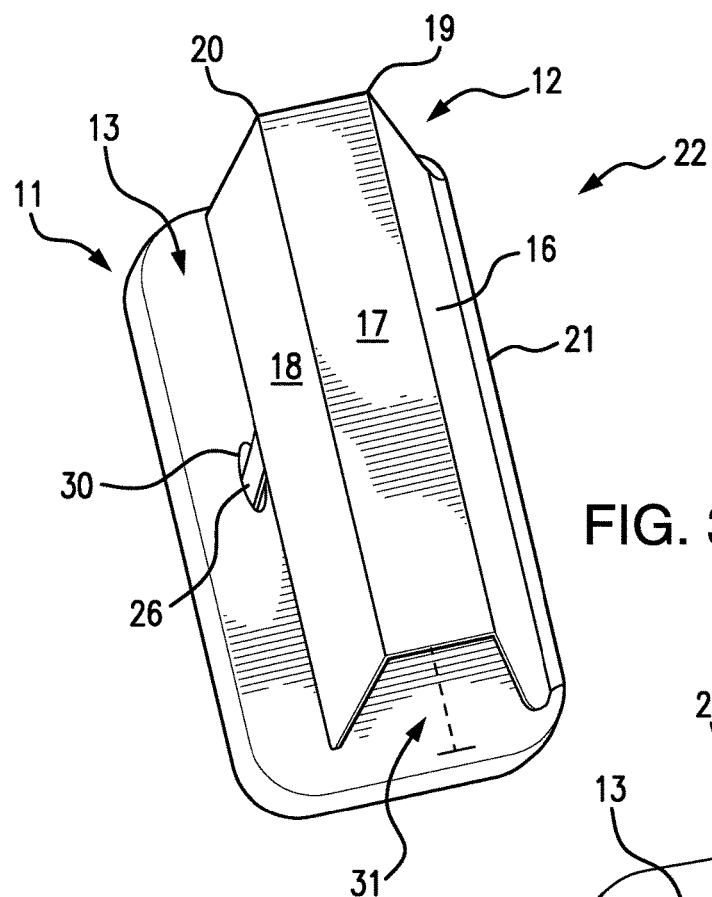
FIG. 3A is a perspective view of the preferred embodiment of the present invention in a cradle configuration at a low medial elevation.
Figure 3B:
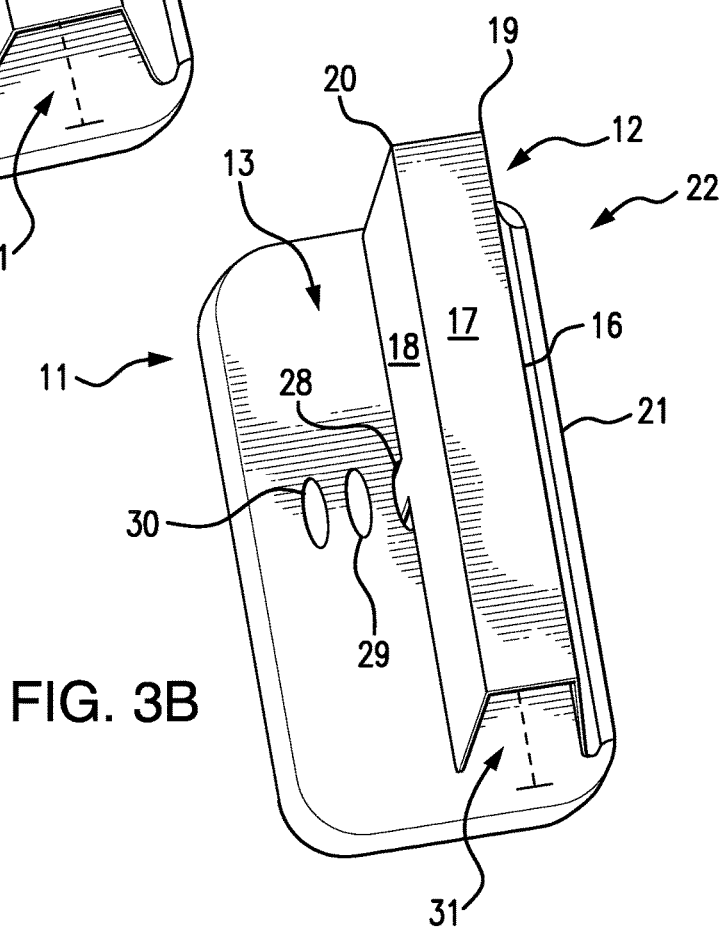
FIG. 3B is a perspective view of the preferred embodiment of the present invention in a cradle configuration at a high medial elevation.

Referring to FIGS. 3A and 3B, two cradle configurations 22 are illustrated, those being a low cradle configuration 30 in FIG. 3A and a high cradle configuration 28 in FIG. 3B. In the cradle configurations 22, the trifold cover panel 12 is arched over the rear wall 13 of the back panel 13. The medial cover section 17 is supported in an elevated, substantially horizontal position at an adjustable medial elevation 31 above the rear wall 13. In this position, the proximal cover section 16 and the distal cover section 18 are each obliquely disposed on either side of the medial cover section 17. The medial elevation 31 is adjustable by moving the primary attachment means 24 between different secondary attachment means 25. For example, in FIG. 3A, the tab 26 has been inserted into a slot 27 corresponding to a low cradle configuration 30, while in FIG. 3B, the tab 26 has been inserted into a slot 27 corresponding to a high cradle configuration 28.

Figure 4:
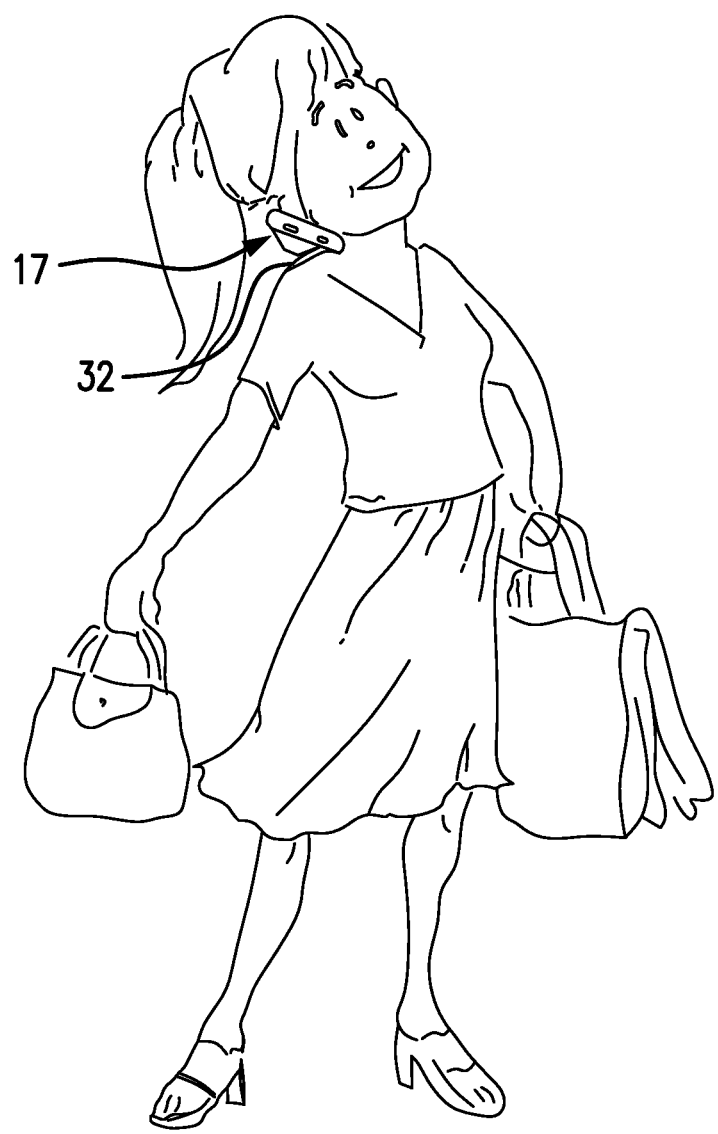
FIG. 4 is a perspective view of the preferred embodiment of the present invention supporting a mobile phone on the shoulder of a phone user.

As shown in FIG. 4, when the present invention 10 is in one of the cradle configurations 22, the elevated medial cover section 17 can be placed on the shoulder 32 of a phone user so as to support the mobile phone above the shoulder of the user at the medial elevation 31. For users having different physical proportions, the cradle configuration 22 can be adjusted to higher or lower medial elevations 31, as explained above.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A protective case for a mobile phone, comprising:
   a back panel, defining a substantially rectangular enclosure having a rear wall and a front opening, into which the mobile phone securely fits with a front face of the mobile phone exposed, wherein the back panel is made of a durable, rigid material;
   a cover panel, having a trifold structure conforming in size and shape to the back panel and longitudinally attached to the back panel by a flexible main hinge strip, wherein the main hinge strip is configured to enable the cover panel to be alternately extended over the front opening of the back panel in a closed configuration, so as to cover and protect the front face of the mobile phone, or arched over the rear wall of the back panel in one of multiple cradle configurations;
   wherein the cover panel comprises three longitudinal cover sections, consisting of a proximal cover section, to which the main hinge strip is attached, a medial cover section, which is longitudinally attached to the proximal cover section by a flexible medial hinge strip, and a distal cover section, which is longitudinally attached to the medial cover by a flexible distal hinge strip;
   wherein the distal cover section of the cover panel has a distal edge which contains a primary attachment means, which conjugately connects with multiple secondary attachment means on the rear wall of the back panel, so as to support the cover panel in the cradle configurations;
   wherein, in the cradle configurations, the cover panel is arched over the rear wall of the back panel, such that the medial cover section is supported in an elevated, substantially horizontal position, having an adjustable medial elevation above the rear wall of the back panel, and such that the proximal cover section and the distal cover section are each obliquely disposed on either side of the medial cover section, and such that the medial elevation can be adjusted by differentially connecting the primary attached means of the distal cover section with the multiple secondary attachment means; and
   wherein, in the cradle configurations, the medial cover section can engage a shoulder of a phone user so as to support the mobile phone at the medial elevation above the shoulder of the phone user, and wherein the medial elevation can be adjusted in accordance with physical sizes and proportions of phone users.

2. The protective case according to claim 1, wherein the primary attachment means is a tab and the secondary attachment means are apertures into which the tab is insertable.

3. The protective case according to claim 1, wherein the primary attachment means and the secondary attachment means are conjugate hook-and-loop fasteners.

* * * * *